United States Patent [19]

Chulick

[11] Patent Number: 5,247,257
[45] Date of Patent: Sep. 21, 1993

US005247257A

[54] ELECTRONIC METAL DETECTOR RETURN SIGNAL PHASE CHANGER

[76] Inventor: Karl Chulick, 243 Belden Dr., San Jose, Calif. 95123

[21] Appl. No.: 839,335

[22] Filed: Feb. 20, 1992

[51] Int. Cl.$^5$ .............................................. G01D 3/11
[52] U.S. Cl. ...................................... 324/328; 324/233
[58] Field of Search .............................. 324/326–329, 324/233

[56] References Cited

U.S. PATENT DOCUMENTS 4,024,468  5/1977  Hirschi ............................... 324/329
4,293,816  10/1981  Johnson .............................. 324/329

*Primary Examiner*—Walter E. Snow
*Attorney, Agent, or Firm*—Mark Jacobs

[57] ABSTRACT

A device is disclosed for use with heterodyne metal detectors to eliminate the indication of the detected presence of certain specific metals to the operator. A specially tuned circuit rotated adjacent the detector interacts with the circuitry of the detector to eliminate the audio and visual response of the detector to certain predetermined undesired metal objects. The device includes two coils, one of low impedance and high resistance and the other of high impedance and low resistance.

9 Claims, 4 Drawing Sheets

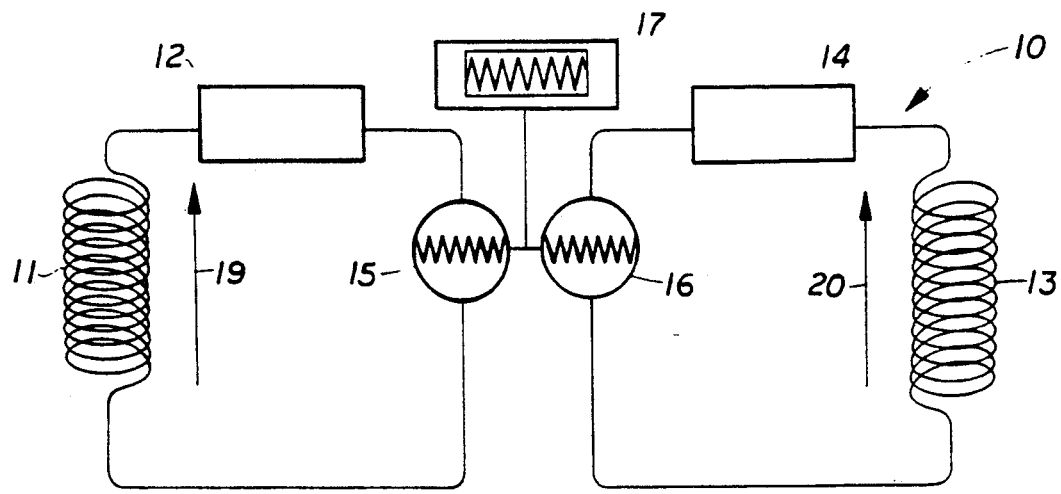
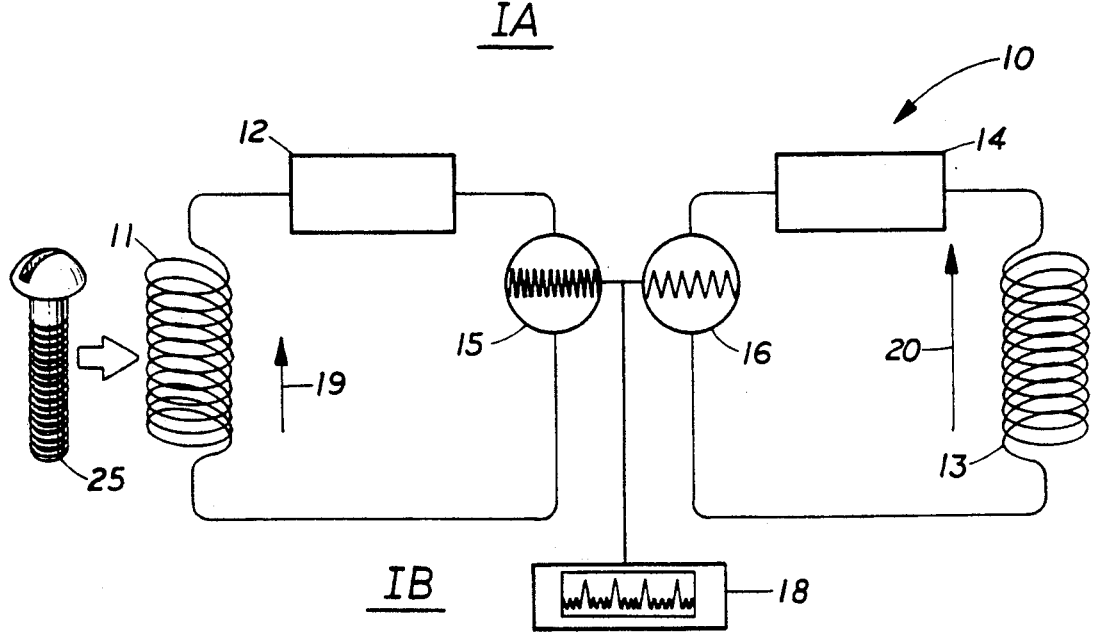
FIG. 1 PRIOR ART
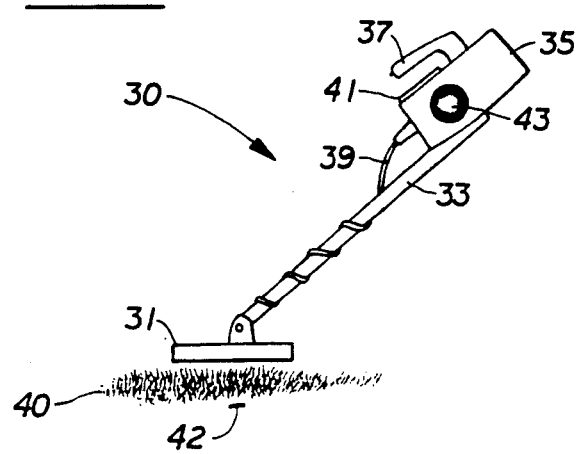
FIG. 2
PRIOR ART

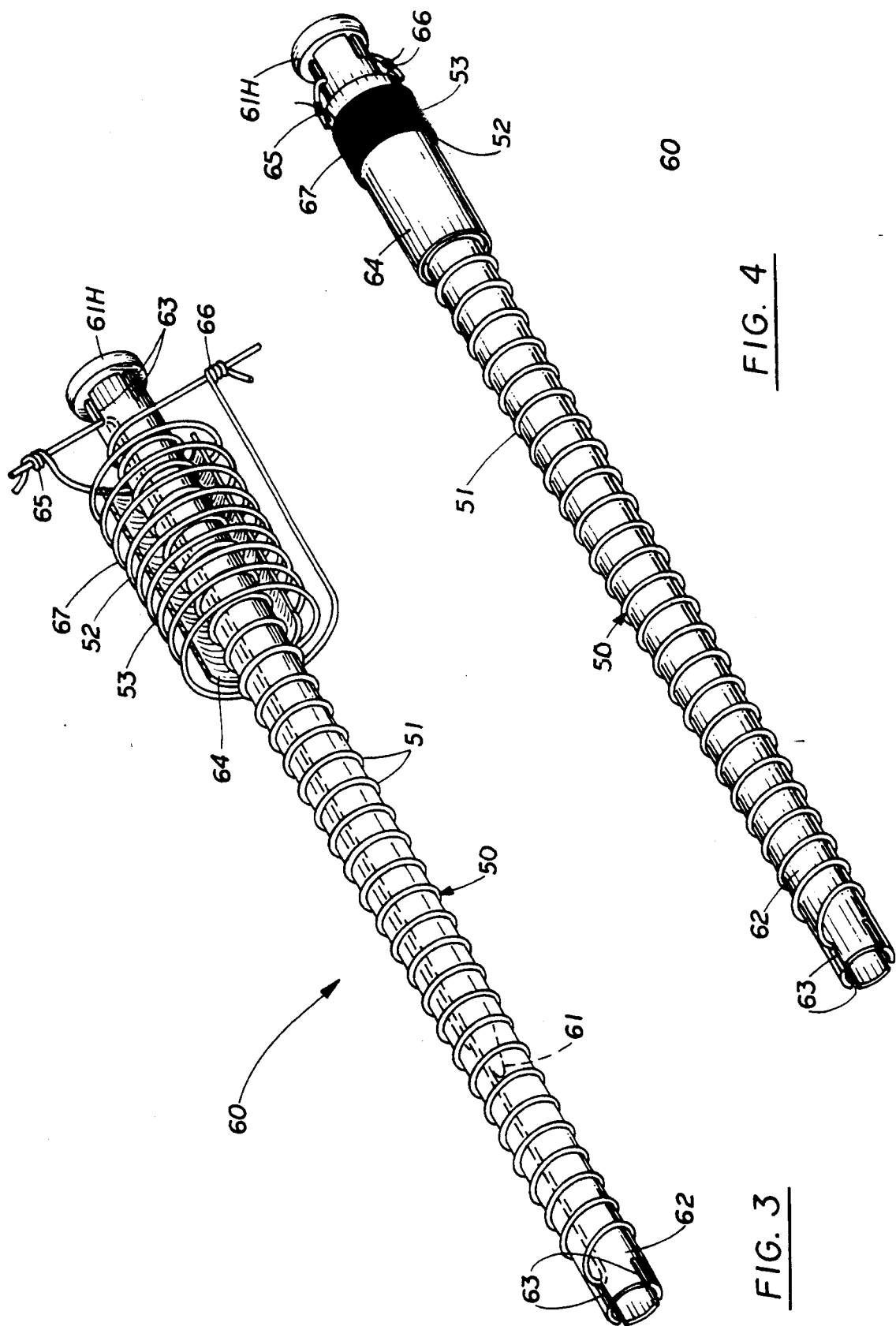

WHERE DOTTED LINE REPRESENTS DEVIATION FROM STRAIGHT LINE CURVE WHEN IRON TARGET IS SENSED IN PRESENCE OF THE WAND

ELECTRONIC METAL DETECTOR RETURN SIGNAL PHASE CHANGER

FIELD OF INVENTION

This invention pertains to tuned circuit devices to be used with conventional metal detectors to eliminate the audio and visual response to certain predetermined metal objects.

BACKGROUND OF THE INVENTION

In order to understand the nature of the instant invention, it is necessary for the reader to have a basic understanding about how metal detectors operate, since this invention is a device usable with a metal detector to refine the detecting capability of the detector, i.e. to render it more selective.

Early detectors were designated as "balanced coil" search units. They used two identical coils, each with a primary and a secondary winding. The primary windings are driven in series by AC current and thereby generating an alternating magnetic field. In a nonmetallic arena the induced voltages of the secondary windings will be equal and therefore no signal is produced. But when a metallic coin or other item is near one of the coils, it produces an induced magnetic field which interacts with the closer of the two secondary windings. The delta or net difference between the signals of the two coils can be amplified to create an audible indication of the presence of the coin or like item. Magnetic induction detectors of this nature are limited to shallow depths of about six inches or so.

The more modern detectors are of the "heterodyne" designation. While operating on the principle of induced magnetism with two coils, each of the coils have only one winding. Each coil is connected to its own oscillator. The two oscillators are adjusted to the same frequency in order for the two coils to produce an alternating magnetic field at the chosen frequency. When a metallic object is located by the detector, the coil which is closer to the object has its inductance changed which thereby changes the frequency of the oscillation of that circuit with respect to the other circuit. When the signals from the two circuits are mixed together, a beat is generated whose frequency can be amplified as may be necessary and reproduced on a meter and through earphones to enable the operator to both see and hear the found metallic item. While reference is made to FIG. 1 which illustrates these principles, the reader need not refer there now for an understanding of the discussion to follow.

Since persons doing metal detection want to discriminate between common nails and gold coins, between aluminum beverage cans and silver bracelets, means have been developed to help discriminate between the "desired targets" and "undesired targets". However oftentimes the very sand in which one is operating or the rocks nearby contain certain metallic minerals which can influence the detector. These are referred to in the trade as "mineralogy". But what happens when the gold coin is in the tin can. The detectors available today can not screen out one from the other. That is the function of the invention of this application.

It is an object therefore of this invention to provide an accessory for use with metal detectors to screen out unwanted targets when such are present with desired targets.

It is another object to provide a phase shifting device which allows the metal detector to eliminate or screen out the iron and not hear it, whereby on passage over a mix of nails and a gold ring only the ring is heard or sensed.

It is yet another object to provide a device for use with a metal detector to permit the detector to selectively provide information on the presence of a desired target which desired target is associated with undesired target(s).

A further object is to provide a device which influences the mode in which the detector processes the information concerning located targets.

A yet further object is to provide a means for the metal detector to broaden its phase response.

A still further object is to provide a tuneable phase shifting device tuneable over the phase angle range of from about −85 to about −55, capable of "blinding" the detector to mineralization and iron such that while detected, no audible or meter reading change will be presented to the user.

An additional object is to provide a device which nulls out the signal obtainable from a metal detector due to the presence of predefined undesirable targets when such are in the presence of desired targets.

Other objects of the invention will in part be obvious and will in part appear hereinafter.

The invention accordingly comprises the product possessing the features, properties and the relation of components which are exemplified in the following detailed disclosure and the scope of the application of which will be indicated in the appended claims.

For a fuller understanding of the nature and objects of the invention, reference should be made to the following detailed description, taken in conjunction with the accompanying drawings.

BRIEF DESCRIPTION OF THE FIGURES

FIGS. 1A and 1B are a diagrammatic view illustrating the basic operating principles of a modern metal detector.

FIG. 2 is a drawing of a typical metal detector available in the marketplace, which detector forms no part of this invention.

FIG. 3 is an a perspective view of the device of this invention partially in section and with the secondary coil enlarged.

FIG. 4 is a perspective artistic rendering of the wand of this invention.

FIGS. 6A–5D are a diagrammatic illustration of the effect achieved by rotation of the device of this invention upon the detector head of a typical metal detector.

SUMMARY OF THE INVENTION

Figure 5A:
FIGS. 5A–5F are a series of graphs which contrast the normal operation of a modern metal detector with respect to the presence of zero target, an undesired iron target, a good target e.g. iron; and a mixture of iron and gold; both with and without the presence of the wand device of this invention properly employed.
Figure 5B:
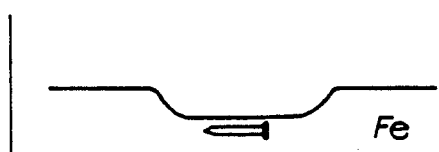
Figure 5C:
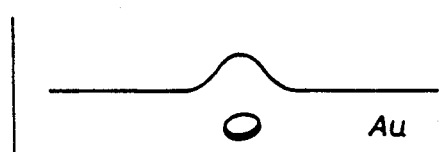
Figure 5D:
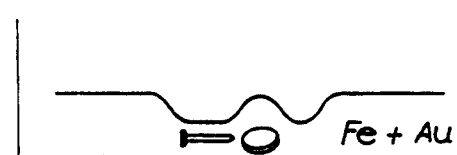
Figure 5E:
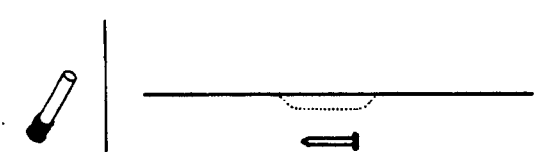
Figure 5F:
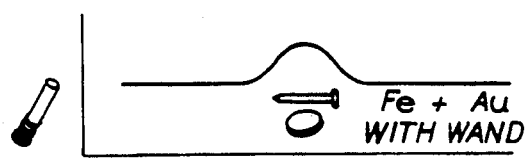
Figure 6A:
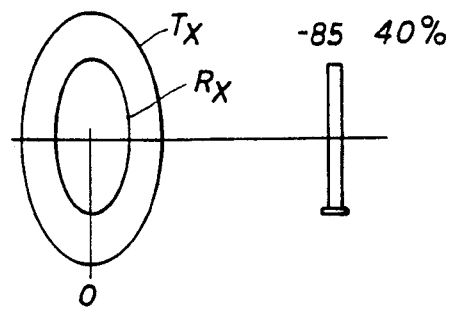
Figure 6B:
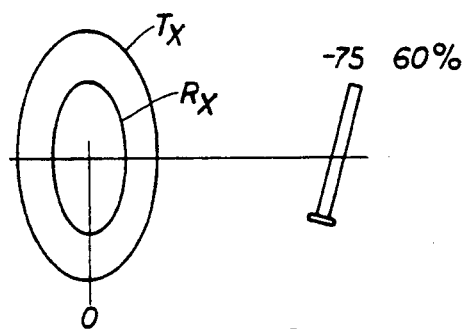
Figure 6C:
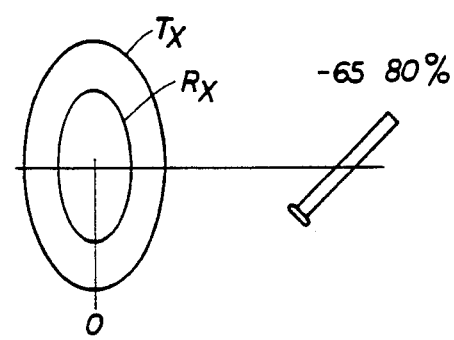
Figure 6D:
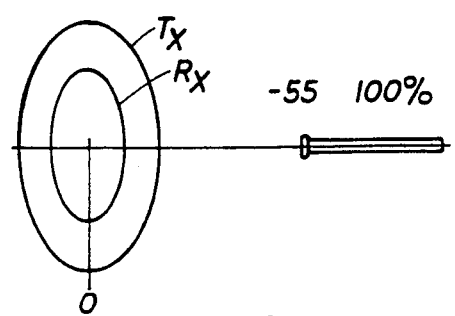

A device for use with a dual coil metal detector, which device nulls out the signal obtainable from a metal detector due to the presence of predefined undesirable targets when such are in the presence of desired targets. The wand of this invention broadens the response of the detector by changing the phase angle of the signal to allow the detector to use a modified return signal from a phasing point of view. The circuitry of the wand "hides" the tuning stubs which are used to tune the detector so that the detector does not "see" the object or the metal winding of the coils, but only sees the phase change produced by the device.

The result is that by selectively alternating the capability of the heterodyne metal detector, no information, audible or meter fluctuation is issued by the detector when undesired targets are sensed; and when desired and undesired targets are present together, the information put out will be only about the desired targets. That is there will be a segregation of desired materials from undesired.

DESCRIPTION OF THE PREFERRED EMBODIMENT

As noted previously, FIG. 1 is divided into two sub-figures set out as an upper section IA and a lower section IB. These diagrams illustrate the conventional operation of a heterodyne metal detector's circuitry 10. Two coils, a search coil 11 and a receiving coil 13 are each connected to their own frequency oscillator 12 and 14 respectively to create similar inductances, 19 and 20. Since the oscillators are tuned to the same frequency, both give rise to same frequency 15, 16 which when mixed together to give a constant pitch 17, as is seen in the diagram.

However when a metallic object such as a screw 25 is brought into the sphere of influence of the search coil, its inductance is lowered—see arrow 19 which is the representation of the inductance—, thereby causing the oscillator 12 to put out a higher frequency 15, as can be seen by the difference in the pattern of 15 from FIG. IA to FIG. IB which when mixed with the frequency 16 of the preset value from the receiving oscillator 14 generates the output beat 18.

Reference should now be made to FIG. 2, which illustrates the physical construction of a typical conventional metal detector. Thus detector 30 includes a search head 31, often called a detector head as well, wherein the circuitry discussed with respect to FIG. 1 is located. Head 31 is connected either permanently or removably to one end of an arm 33 which arm is in turn connected to a control box 35, having a handle 37 thereupon. Control box 35 includes a meter 41 and a speaker 43, both of which are electrically connected to the head 31 and to a battery within control box 35 by circuitry well known in the art.

Head 31 is seen to be spaced slightly from grass 40 within which is a coin or other target 42.

Reference is now made to FIG. 3 which is a perspective view of the device of this invention partially in section and with the secondary coil enlarged, and to FIG. 4 which I refer to as an artistic rendition of the inventive wand as designated 60 in FIG. 4. It comprises a steel or iron rod 61 which may vary in length from about 3.0 to 4.0 inches with 3.5 being preferred. Typically a headed nail may be used as such are readily available at minimum cost. Nail 61 is placed within a fiber glass, preferably circular, tube 62 such that a portion such as head 61H is not encased within the enclosure 62. Other suitable insulating material can be substituted for the fiber glass of tube 62. A first coil 51 black annealed high resistance low impedance wire, 50 is disposed at the end of the enclosure 62 distal to the nail head 61H. A pair of spaced opposed slits 63 in said tube 62 permit the ends of coil 51 to enter tube 62 for travel adjacent nail 61. A full layer of insulating tape 64, (shown here cut away) such as nylon filament tape or equal is overlaid around the end of the 4 primary winding 51 closest to head 61H. Wrapped around this tape which acts as a capacitive insulator, is a secondary coil 53 of high impedance low resistance wire 52 (shown here much enlarged). One end of each of the two coils 51,53 is joined together to form a capacitive coupling at each junction, 65, 66. An inductive coupling 67 is formed between the two coils and the insulation 64 therebetween which coupling is designated 67.

Figure 7:
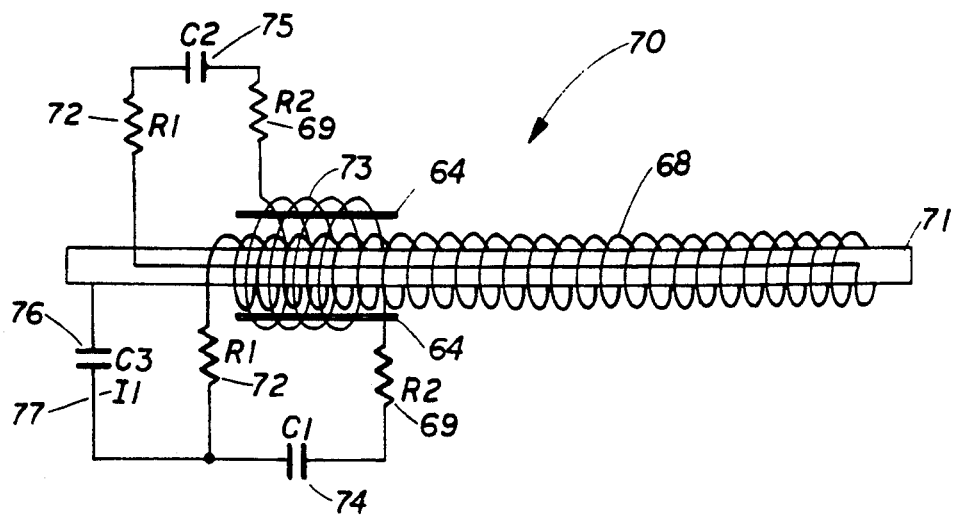
FIG. 7 illustrates the schematic of electrical circuit involved in the operation of the device of this invention.

Let us now turn to FIG. 7 which illustrates the electrical circuitry 70 involved in the device of this invention. Here a ferrite or iron rod such as a nail 71 similar to the nail designated 61 in FIGS. 3 and 4 is wrapped with a coarse winding 68 of high resistance low impedance wire having a resistance R1 designated 72. A second or tighter winding 73 of low resistance and high impedance wire is overlaid on said first winding with an insulation layer 64 interposed therebetween. This second winding has a resistance R2, designator 69.

Note that there are two of these R2 designators, one on each side of the coarse winding 68. C1, 74, is the capacitive coupling between the two circuits, one of which is of high and the other low impedance. C2, designator 75, represents the capacitive coupling between the low and the high impedance circuits. While C3, 76, is the capacitive coupling between the high impedance and low impedance coils and the iron tuning stub. Lastly l1, designator 77 represents the inductance that arises from the generated eddy current fields of the transmitted signal.

Now that the circuitry involved has been reviewed, reference is made to FIGS. 5A through 5F which graphically illustrate and contrast the audio signal generated by the metal detector under (5A) a no target condition; (5B) undesirable iron target; (5C) desired gold target; (5D) a mixture of gold and iron targets; (5E) iron target only in presence of the wand of this invention; and (5F) the mixture of gold and iron targets in presence of wand of this invention.

Thus FIG. 5A illustrates the straight line threshold level signal when no targets are seen. This threshold dips down in the presence of iron, i.e. when the unit detects the presence of nails for example (5B). Note the presence of the peak, i.e. in the plus range when the gold coin is seen in FIG. (5C). The problems that arise which gave rise to the need for the device of this invention is seen in FIG. (5D). Here the summing effect of the iron and gold gives two valleys and one peak, but the peak is below the audible detection level.

When a wand is used with the Eagle or similar metal detector, —symbolized by the cylinder symbol for the wand before the curve—there is only a slight dip in the threshold level when an iron target is sensed. Contrast this to FIG. (5B). But now note the effect on the curve in FIG. (5F) when the tuned detector is in the presence of both iron nails and a gold coin for example, i.e. any desired and undesired target mix. This curve difference shows up on the meter and in the ear and thus permits the operator to scrutinize his findings better.

FIGS. 6A through 6D pictorially illustrate the presence of eddy current forces generated by the presence of the wand near the detector head and the effects thereof.

The wire 50 used for the primary winding, 51, i.e. the one with the wider spacing between coils is preferably made of high resistance low impedance black anneal iron of about 24 gauge, while the secondary winding 53, is constructed preferably of high impedance and low resistance insulated copper wire 52 of about 34 gauge. For the larger or primary winding I suggest the use of 30 to 32 turns; and for the secondary winding I recommend using about 30 turns. I use about 36 inches of the black annealed iron and about 38 inches of the insulated copper wire respectively for the two windings. In the primary winding which as noted is about 3 ⅜ths inches long, I have spaced the windings about ⅛th inch apart. The number of turns for each of the windings as recited above gives rise to a particular coupling with a particular phasing. If I used for example 16 turns and 18 turns respectively for the two windings, I would obtain a different coupling and phasing. This shifting up or down the band would affect the sensitivity in the iron area or in the mineral area for example. I have found that the preferred numbers of windings as noted above, serve to null out the iron such as from nails, and other nondesired iron and steel containing targets.

If the windings are converged such that part of the rod is uncovered, even if the total number of windings remains constant, one eliminates the lower end of the scale toward the negative numbers as far as sensitivity of the detector is concerned.

On the other hand, if I use an excessive number of turns in the primary winding, I end up with the result that due to the presence of an excessive amount of iron, the metal detector 30 will not balance out. If the gauge of especially the primary winding's black anneal iron wire is increased, the detector tends to see more toward the iron side, while if the gauge is decreased, the effect of using the wand becomes de minimis.

If the copper wire content of the secondary winding is increased excessively through either the use of more turns per winding or by heavier gauge wire, the detector 30 sees the wand as a positive target rather than as a nulling device. Thus, above about 40 windings, the positive target effect would transpire.

Thus if I used a lesser number of windings over the same 3.5 to 4 inch length of rod, by spacing each of them further apart, I lose sensitivity in the area below −85 such that the ranging is narrowed. Thus I have found that by extending the or lengthening the windings out farther, one loses both the density of the field of the detector and the effect of the wand itself, i.e. its nulling ability.

UTILIZATION OF THE WAND WITH A WHITES EAGLE SERIES METAL DETECTOR UNIT

Figure 8A:
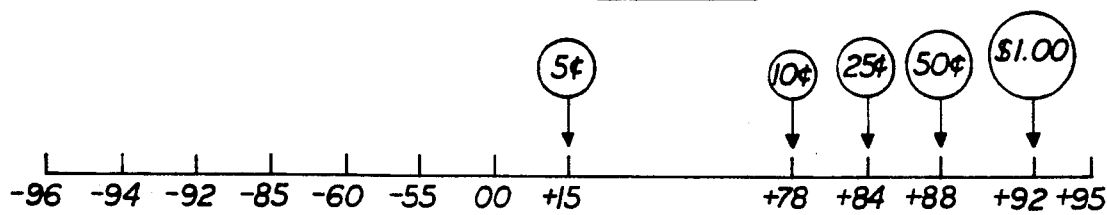
FIG. 8A depicts linearly phase angle measurements and the location on the scale at which common U.S. coins would be detected.
Figure 8B:
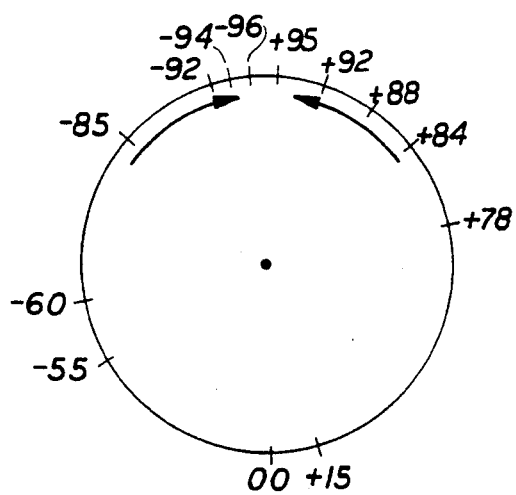
FIG. 8B is a circular plot of these points without the coin indicia.

Prior to the discussion of the use of the apparatus of this invention, it will be beneficial to understand how the phase angles discussed elsewhere are plotted. Reference is made to FIGS. 8A and 8B which illustrate both linearly and circularly how the various phase angles are set out. In addition, FIG. 8A points out the locations on the plot, wherein common U.S. coins would be detected by the apparatus.

As is known in the art, the metal detector 30 must be air and ground balanced and this is carried out conventionally. When the unit is placed into its Jewelry mode so as to pick up gold and silver, and a bottle cap containing iron is brought adjacent the detector head, a broken signal due to the rust from the cap is heard. When a handful of nails are brought to the detector, the threshold level drops and the signal strength meter moves sharply and the sound intensifies. When a ring, which had been tested previously separately and which had been found to be detected as a good target both on the meter and audiowise, was placed among the nails, the ring becomes lost. That is, due to the summing effect of the two signals, the detector cancels out the presence of the ring and thus the operator would not find it down in the dirt with the nails.

In order to demonstrate the benefit of the invention, one should preferably turn on the SAT or self-adjusting threshold switch to balance the machine for the soil and mineral conditions. The mode is set purposely at ALL METAL. In this mode, nails, titanium, iron bottle caps and gold such as rings will all be picked up.

The wand is then brought toward the detector head, held about 4 to 5 inches from the head and in the same axis as the field. One then ground and air balances the detector as is known to the art. The SAT, i.e. the self-adjusting threshold and the ground tracking are also turned off. This in essence locks the detector in this mode so that the effects of the wand of this invention can be fully realized.

By varying the wand position and angle of the wand, relative to the detector head's axis, one can change the phase angle response of the transmit and receive signals.

When the wand is held in line with the center axis of the detector head and about 4" to 5" away with the detector being air and ground balanced, one will have a resulting phase angle and broadened response that will eliminate the range of the LOW mineral and iron from detection (−92 through −55). Almost 100% of the small iron objects seen will be eliminated. See FIG. 6D.

When the wand is held at the same location, and rotated per the figure noted above, such that it assumes a 45 degree angle to the axis of the detector head and the unit is air and ground balanced as normal, the phase angle achieved is one such that there is a broadened response that will eliminate the area of LOW (−92 through −65), Mineral and partial iron area. In this situation about 60% of small iron is eliminated. See FIG. 6C.

When the unit is rotated even further, to a 90 degree angle to the axis of the detector head, and air and ground balanced as normal, one achieves a phase angle and broadened response that will eliminate the area of LOW (−92 through −85) i.e. mineral and partial iron area. In this position, 30% of small iron is eliminated. See FIG. 6A.

It is seen therefore that the modified and broadened phase angle response to the transmit and receive signal phasing produced by the transmitter and received by the metal detector will eliminate various amounts of the undesirable metal content (iron) and (minerals) present in the soil. By similar phase angle shifting mineralization and HOT ROCKS can also be eliminated from detection by the detector.

The results noted here are believed to be achievable with any and all of the White's TM Eagle, Eagle II, Eagle SL90, Eagle SL 90.5, and Eagle Spectrum detector units.

THEORY OF OPERATION

While no explanation is offered as being absolute, the following is theorized as being the basis of the results achieved as noted above. It is believed that the fluctuating eddy currents generated in the wand coils by the transmitter oscillating frequency, change the phasing and the detector's response to the return signal. The position of the wand in relation to the field generated by the transmitter changes the phase angle response that the detector receives in its receive coil(s). This is accomplished by introducing the high impedance coils straight into the flux field or at an angle to the flux field of the detector head. The ratio of the flux changes produce varying responses to the phasing of the return signal to the detector.

All of this is achieved without the use of battery provided power or any other power. Rather the principle of operation relies upon the eddy currents that are generated within the wand to change and broaden the phase of the transmit-receive signal.

In recapitulation it is seen that, when the wand of this invention's phase angle and its distance from the detector head are altered, one can vary the response to the little tuning stub. Thus the detector can be permitted to "see" the wand as iron and mineral content; or by shielding the detector response from the tuning stub, to permit the detector to not see the iron and mineral content and therefore send out a clear audio signal and meter reading only when desired targets are seen. My research has shown that the results obtained from using the device of this invention, are not achievable internally within metal detectors constituting the state of the art. And best of all, the detector unit need not be reprogrammed to reach the results obtainable with the device of this invention and further more there is no loss of target response when the device of this invention is employed.

Since certain changes may be made in the above device without departing from the scope of the invention herein involved, it is intended that all matter contained in the above description and shown in the accompanying drawings shall be interpreted as illustrative and not in a limiting sense.

I claim:

1. A device for use with dual coil metal detectors to null out the signal obtainable from a metal detector due to the presence of predefined undesirable targets, when such are present along with desired targets, which device comprises:
   a metal rod having a larger portion and a smaller portion;
   an insulated tube, having distal and proximal openings;
   the larger portion of said rod being fixedly disposed within the electrically insulated tube, the smaller portion being outside of said tube, at the proximal opening thereof,
   a primary high resistance low impedance coil having two ends, said coil disposed on and encircling said tube distal from the smaller portion of said rod, one of said coil ends being disposed into said tube's distal opening and exiting at said proximal opening;
   a secondary coil of low resistance and high impedance also having two ends, overlaying said first coil but spaced therefrom;
   an insulative layer interposed between the two coils, one end of each of said coils being electrically connected, but spaced from each other to form two capacitive couplings,
   said coils also forming an inductive coupling in combination with said interposed insulative layer.

2. In the device of claim 1 wherein upon detection of the combination of desired and undesired targets, only indicia about the desired target is provided, wherein the indicia is in the form of an audible signal.

3. In the device of claim 1 wherein upon detection of the combination of desired and undesired targets, only indicia about the desired target is provided, wherein the indicia is in the form of the fluctuation of a meter needle.

4. In the device of claim 1 wherein upon detection of the combination of desired and undesired targets, only indicia about the desired target is provided, wherein the indicia is in the form of an audible signal and the fluctuation of a meter needle.

5. In the device of claim 1 wherein the primary coil is made of black anneal iron wire and the secondary coil is made from copper wire.

6. In the device of claim 1 wherein the secondary coil is slightly longer in linear content of the coil than is the primary coil.

7. In the device of claim 6 wherein the primary coil is made of 24 gauge wire, while the secondary coil is made of about 34 gauge wire.

8. The process of selectively alternating the response of a previously air and ground balanced heterodyne dual coil metal detector to permit the detector to not respond to the presence of specific predetermined undesired target metals when they are present in combination with a desired target metal, such that no indicia of the presence of the predetermined undesired targets is put forth, which process comprises:
   rotating a device having capacitive and inductive coupling relative to the center axis of the detector's head to modify the phase angle response of the transmit and receive signals of the detector to thereby eliminate the recognition of the undesired targets by the metal detector.

9. The process of selectively alternating the response of a previously air and ground balanced heterodyne dual coil metal detector to distinguish between desired and undesired targets when they are present in combination, such that no indicia of the presence of predetermined undesired targets is put forth, as in claim 8 which comprises:
   rotating the device of claim 8 relative to the center axis of the detector's head to change the phase response of the detector.

* * * * *